March 10, 1953 C. H. O. BERG 2,630,877
ADSORPTION PROCESS AND APPARATUS
Filed Nov. 15, 1948
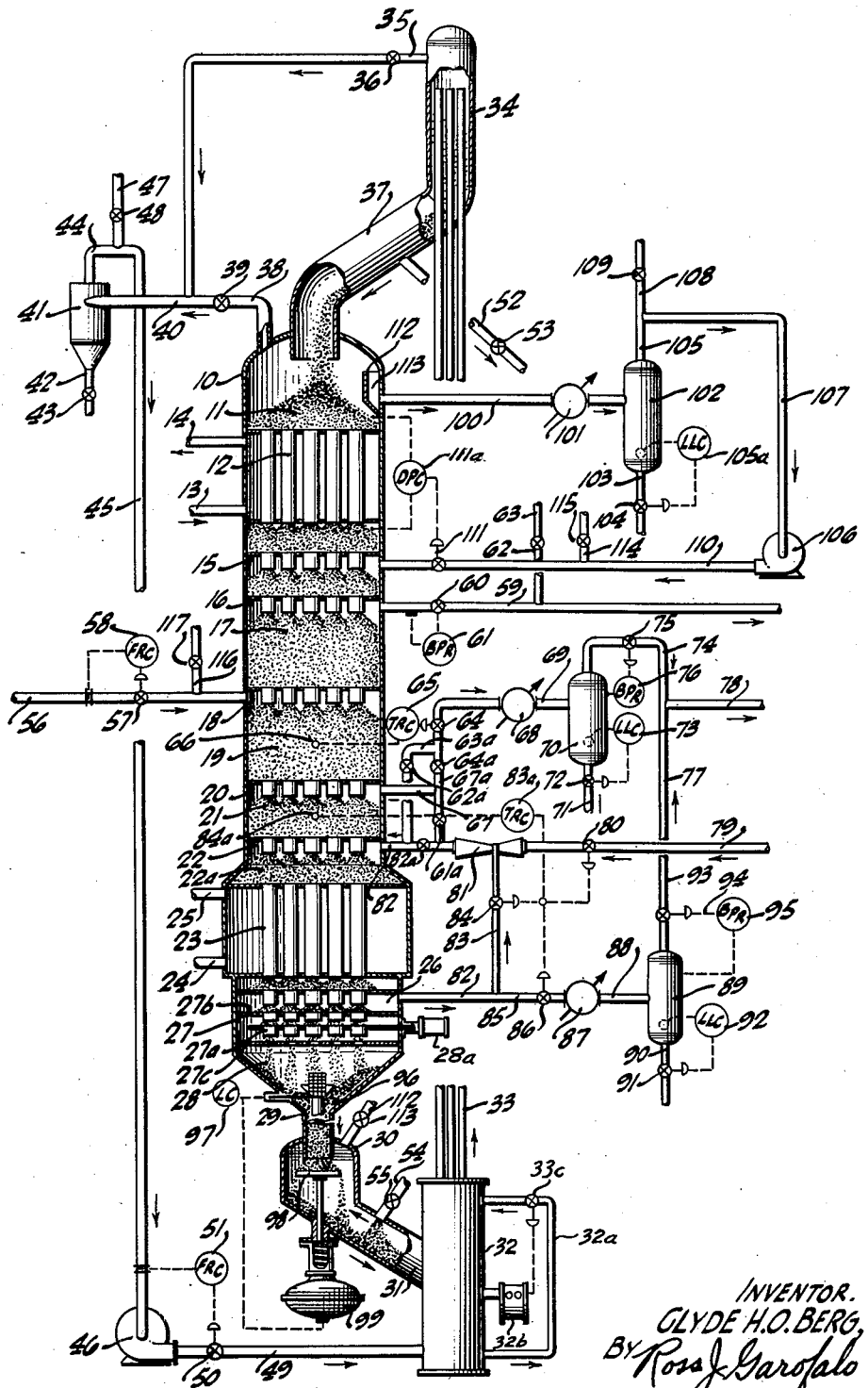
INVENTOR.
CLYDE H.O. BERG,
BY Ross J. Garofalo
ATTORNEY.

Patented Mar. 10, 1953

2,630,877

UNITED STATES PATENT OFFICE 2,630,877

ADSORPTION PROCESS AND APPARATUS

Clyde H. O. Berg, Long Beach, Calif., assignor to Union Oil Company of California, Los Angeles, Calif., a corporation of California Application November 15, 1948, Serial No. 60,034

29 Claims. (Cl. 183—4.2)

This invention relates to an improved method and apparatus for the separation of gaseous mixtures by continuous selective adsorption and in particular relates to an improved process in which recirculating gas streams are employed to condition the adsorbent prior to and following contact with the gaseous mixture being separated.

The continuous selective adsorption process is applicable with advantage to the separation of many gaseous mixtures which have heretofore been separated by the well known processes of distillation or absorption. With gaseous mixtures having low critical temperatures these conventional processes encounter economic and operational difficulties in the compression and refrigeration of the feed and reflux streams. For example, a low temperature distillation column preparing methane as an overhead product must operate at a pressure in the range of 500 to 600 pounds per square inch and be furnished with reflux at a temperature of about —150° F. In contradistinction to these conventional processes for gaseous mixture separation they may be separated at nominal pressures and temperatures by the selective adsorption process wherein the gaseous mixture is contacted with a moving bed of solid granular adsorbent. The process of selective adsorption is based upon the phenomenon noted in adsorbents wherein certain constituents of a gaseous mixture are more strongly adsorbed than are others. Gases having the higher critical temperatures or the higher boiling point or the higher van der Waals' constant "$a$" in general are more adsorbable. A gaseous mixture therefore under proper conditions of operation and adsorbent selection may be separated into two or more individual fractions of high purity by contacting them with a solid granular adsorbent. The process of selective adsorption herein described takes advantage of this preferential adsorption phenomenon and by providing a system of fractionation both in the adsorption step of the process and in rectification and desorption steps, gaseous products of high purity may be produced at high recoveries.

The selective adsorption process is one in which a moving bed of solid granular adsorbent is recirculated downwardly through a vertical column as a moving bed. The column is provided at successively lower levels with a tubular cooling zone through which the adsorbent passes to be indirectly cooled, an adsorption zone, at least one rectification zone, a preferential desorption zone or a steaming zone, an indirect heating zone, an adsorbent feeding zone which controls the flow rate of the adsorbent through the column, and a bottom zone in which the adsorbent collects to form a level. The adsorbent is removed from the bottom zone and is conveyed to the top of the column where it is reintroduced for repassage therethrough. The gaseous mixture to be separated or feed gas contacts the moving bed of granular adsorbent in the adsorption zone wherein the more readily adsorbable constituents are adsorbed forming a rich adsorbent leaving an unadsorbed lean gas. The rich adsorbent is subsequently contacted with a countercurrent flow of stripping gas such as steam in a steaming zone where the major proportion of adsorbed constituents are desorbed as a rich gas. The adsorbent is indirectly heated and contacted with further quantities of stripping gas in countercurrent contact to desorb remaining constituents leaving a hot lean adsorbent which is cooled and recycled to contact further quantities of feed gas. Steam has been found to be an excellent stripping gas and it is preferentially adsorbed by the rich adsorbent, displacing the rich gas, and the adsorbent containing adsorbed steam flows into the heating zone. The steam is desorbed and returns as an internal stripping gas recycle to the steaming zone where it is readsorbed. Due to this recycle, the actual countercurrent stripping gas flow through the upper portion of the heating zone tubes is many times the actual stripping gas throughput. Frequently, the quantity of material in the feed gas which is to be adsorbed and produced as a rich gas is in considerable proportion and the diameter of the column is determined by the area necessary to permit this recycle stripping gas flow to pass through the heating zone where actually smaller columns could be used in the absence of the recycle.

The selective adsorption process above described is particularly well adapted to the separation of gaseous mixtures in which the more readily adsorbable constituents are present in minor amounts and is described and claimed in a copending application, Serial No. 730,166 filed February 21, 1947, and now U. S. Patent No. 2,550,955.

Peculiar problems arise when the selective adsorption process is applied to the separation of a gaseous mixture containing an appreciable fraction of gaseous constituents which are more readily adsorbable on the adsorbent. Proportionately higher adsorbent to feed gas ratios are required than if the fraction of adsorbable constituents is small. In such instances the diameter of the selective adsorption zone, the vertical selective adsorption column, through which the adsorbent is passed is not determined by the quantity of feed gas flow but is determined by the quantity of adsorbent required to adsorb the adsorbable fraction or by the quantity of recycle stripping gas passing through the desorption zone to desorb the adsorbed material. Because of the large proportion of adsorbent employed to separate a given quantity of feed gas the cooling duty of the heat exchange means employed to cool the adsorbent is increased.

This invention is therefore directed to a method and apparatus for selective adsorption in which tower diameters are reduced by employing a combination of concurrent and countercurrent stripping to effectively desorb large quantities of rich gas from the adsorbent with a minimum of stripping gas and to a method for efficiently cooling the hot lean adsorbent produced from the stripping step with a minimum requirement of cooling medium.

The primary object of this invention is to provide an improved selective adsorption process in which adsorbed material is removed as a rich gas product by concurrent and countercurrent stripping operations.

It is also an object of this invention to provide an improved selective adsorption process in which use is made of recirculating gas streams to condition the adsorbent prior to the adsorption step and also following the adsorption step.

It is another object of this invention to provide an improved selective adsorption process in which the adsorbent heating and cooling requirements are considerably reduced by such recirculating streams.

An additional object of this invention is to provide an improved process which is specifically adapted to the separation of gaseous mixtures in which the fraction produced by adsorption on and the desorption from the adsorbent is a substantial fraction of the entire gaseous mixture such as from about 5% to as high as 50% or higher by volume.

A further object of this invention is to provide a method for the direct cooling of hot lean adsorbent saturated with stripping gas in which a recirculating lean gas stream desorbs stripping gas from the adsorbent thereby lowering its temperature.

An additional object of this invention is to provide a method for desorbing adsorbed constituents from the adsorbent in which the rich adsorbent is first treated countercurrently with stripping steam to desorb adsorbed constituents and the partially stripped adsorbent resulting is subsequently treated with a concurrent flow of stripping steam which may be recirculated while the adsorbent is being indirectly heated.

Another object of this invention is to provide an improved apparatus for the selective adsorption process as outlined in the above-mentioned objects.

Other objects and advantages of this invention will become apparent to those skilled in the art as the description and illustration hereof proceed.

Briefly, the present invention comprises a modification of the selective adsorption process and apparatus wherein a combination of the steps of countercurrent and concurrent contact of stripping gas and rich adsorbent is employed to reduce the high gas flow rates normally encountered in stripping and still retain efficient desorption of adsorbed constituents. The hot lean adsorbent saturated with stripping gas is subsequently treated to effect a direct cooling thereof by direct contact with a recirculating stream of a lean gas fraction. These adsorbent conditioning operations permit the use of smaller adsorption columns than are required where direct countercurrent contact of stripping gas and adsorbent is used and reduced utilities requirements.

The gaseous mixture to be separated is contacted with a moving bed of solid granular adsorbent in the adsorption zone wherein the more readily adsorbable constituents are adsorbed forming a rich adsorbent leaving a lean gas substantially unadsorbed. The rich adsorbent is subsequently contacted in a rectification zone with a rich gas reflux together with some stripping gas thereby desorbing less readily adsorbable constituents forming a rectified adsorbent containing only constituents desired in the rich gas product.

The rectified adsorbent passes from the rectification zone to be contacted by a countercurrent stream of stripping gas which is preferentially adsorbable under the conditions of operation. The major proportion, such as better than 75%, of the adsorbed gases are hereby removed from the adsorbent and produced as a rich gas fraction leaving a partially stripped adsorbent containing a minor proportion of adsorbed gases. The partially stripped adsorbent is subsequently contacted with a concurrent stream of stripping gas which may be recirculated while the adsorbent is indirectly heated to remove the remaining minor proportion of adsorbed constituents from the adsorbent. All of the stripping gas may be recirculated with additional quantities of stripping gas to contact further quantities of rich or partially stripped adsorbent or only part may be recirculated in which case the unrecirculating portion of stripping gas is treated for the separation of desorbed constituents which are then combined with those produced from the preferential desorption zone.

The hot lean adsorbent saturated with stripping gas is conveyed as previously described to the top of the column wherein it passes through the cooling zone in indirect heat exchange with a cooling medium. A lean gas stream comprising the less readily adsorbable constituents of the gaseous mixture is passed through the cooling zone in direct contact with the adsorbent whereby the adsorbed stripping gas present on the adsorbent is desorbed thereby removing heat of desorption from the adsorbent and lowering its temperature. The desorption of stripping steam in this fashion directly cools the adsorbent and reduces the quantity of cooling medium which is required in the indirect cooling operation. The cooled lean adsorbent thus produced is saturated with constituents of the lean gas stream and is introduced into the adsorption zone to contact the gaseous mixture to be separated.

The gas streams briefly described above cofunction with one another to condition the adsorbent employed in the process in such a way as to minimize heating and cooling requirements, and also to minimize the quantity of stripping gas required as well as the diameter of the tower.

The present invention may be more clearly understood by reference to the accompanying drawing which shows a vertical cross section of the selective adsorption column in which the above-described improvements are shown. Referring now more particularly to the drawing, the vertical selective adsorption zone comprises column 10 downwardly through which is passed the moving bed of granular adsorbent. Selective adsorption column 10 is provided at successively lower levels therein with hopper or adsorbent storage zone 11, adsorbent cooling zone 12 provided with inlet 13 and outlet 14, drying gas engaging zone 15, lean gas disengaging zone 16, adsorption zone 17, feed gas engaging zone 18, rectification zone 19, rich gas disengaging zone 20 which may serve as the stripping gas engaging zone, preferential desorption or steaming zone 21, stripping gas engaging zone 22 which may also serve as the rich gas disengaging zone, second desorption zone 22a, heating zone 23 provided with inlet and outlet 24 and 25, a stripping gas disengaging zone 26, adsorbent feeding zone 27 and bottom zone 28. The adsorbent is removed from bottom zone 28, after passing downwardly through the aforementioned zones, through sealing leg 29 and is introduced into adsorbent flow control chamber 30 from which the adsorbent passes via transfer line 31 into induction zone 32.

In order to seal the lower portion of the selective adsorption column against contamination, line 112 provided with valve 113 removes gas from adsorbent flow control valve chamber 30. This gas comprises a mixture of stripping gas passing downwardly through sealing leg 29 and lift gas passing upwardly through transfer line 31. In this manner stripping gas does not contaminate the lift gas stream and constituents of the lift gas are not allowed to enter the lower portion of the column where they would contaminate the rich gas product.

A lift gas, which may comprise a portion of the lean gas, is introduced into induction zone 32 to form a suspension of the adsorbent which is conveyed via multitube lift line 33 upwardly into impactless separator 34 wherein the adsorbent is separated from the lift gas. Part of the lift gas may be removed from the impactless separator 34 via line 35 controlled by valve 36. The lift gas and the separated adsorbent flow downwardly from impactless separator 34 as substantially independent phases through transfer line 37 for reintroduction into adsorbent storage zone 11 for repassage through column 10. The lift gas is removed from the upper portion of column 10 via line 38 controlled by valve 39 and is joined by lift gas removed from the upper portion of impactless separator 34. The finer adsorbent particles which are undesirable in the circulating adsorbent bed are elutriated from the large particles and remain suspended in the lift gas which is introduced via line 40 into centrifugal separator 41. The separated adsorbent fines are removed therefrom via line 42 controlled by valve 43. The suspended solids-free lift gas is removed from the separator via line 44 and the major proportion of which is passed via line 45 to lift gas blower 46. If desired, additional lean gas or other lift gas may be introduced into the system via line 47 controlled by valve 48 or accumulations of lift gas in the system may be removed from lines 44 and 45 by this means and combined with lean gas product via line 62 controlled by valve 63. The lift gas blower discharges lift gas via line 49 into induction zone 32 at a rate controlled by valve 50, which in turn is actuated by flow recorder controller 51 at a constant value into induction zone 32.

A portion of the circulated adsorbent may be continuously removed from the system and subjected to an independent high temperature reactivation to maintain the efficiency of the adsorbent at a desirably high level. To effect this, a portion of the hot lean adsorbent passing from impactless separator 34 through transfer line 37 is by-passed through line 52 controlled by valve 53 and is introduced into a reactivator not shown, wherein it is reactivated. The reactivation may comprise a high temperature steam treatment in which temperatures between 500° F. and 1500° F. are employed. The reactivated adsorbent then passes from the reactivator via line 54 controlled by valve 55 and is combined with the adsorbent flowing through transfer line 37 into induction zone 32.

The feed gas mixture to be separated is passed by means of line 56 controlled by valve 57 which in turn is actuated by flow recorder controller 58 into feed gas engaging zone 18. The feed gas passes upwardly through adsorption zone 17 in countercurrent contact to a downwardly flowing bed of solid granular adsorbent whereby the more readily adsorbable constituents of the feed gas are adsorbed. A rich adsorbent is formed leaving the less readily adsorbable constituents as a substantially unadsorbed lean gas. This lean gas passes upwardly into lean gas disengaging zone 16 wherefrom a portion is removed via line 59 at a rate controlled by valve 60 which is actuated by back pressure regulator 61 so as to maintain a given pressure in the system. This lean gas product may be combined with lean gases from other parts of the system via line 62 controlled by valve 63. The remaining portion of the lean gas product passes upwardly into the upper portion of column 10 and is combined with a recirculating lean gas stream, which will subsequently be described, introduced into drying gas engaging zone 15.

The rich adsorbent formed in adsorption zone 17 passes downwardly through the tubes of feed gas engaging zone 18 and enters rectification zone 19. The rich adsorbent is herein contacted with a reflux gas containing more readily adsorbable constituents and through a preferential adsorption thereof a small quantity of adsorbed less readily adsorbable constituents is desorbed from the adsorbent forming a rectified adsorbent. The quantity of reflux gas so introduced into rectification zone 19 is controlled by valve 64 which in turn is actuated by temperature recorder controller 65 operated from thermocouple point 66. Point 66 serves to detect increases in adsorbent temperature caused by the preferential adsorption of more readily adsorbable constituents and the control system is adapted to decrease the rate at which rich gas is removed from rich gas disengaging zone 20 via line 67 when additional reflux is required in rectification zone 19, a condition indicated by a decreasing temperature at point 66.

The treatment of the rectified adsorbent may be conducted in several ways in which the adsorbent is first contacted with a countercurrent flow of stripping gas and subsequently a concurrent flow. The major portion of rich gas is desorbed by preferential adsorption of the stripping gas in countercurrent contact to form a partially stripped adsorbent. The remaining portion is subsequently desorbed by concurrent flow of stripping gas and indirect adsorbent heating.

In one modification which shall be termed operation I, the rectified adsorbent passes from rectification zone 19 into preferential desorption zone or steaming zone 21. Herein the rectified adsorbent is contacted with a countercurrent flow of stripping gas such as steam which is preferentially adsorbed by the adsorbent displacing or desorbing the adsorbed constituents from the adsorbent. The desorbed constituents comprise a rich gas which collects in rich gas disengaging zone 20. A portion of this gas passes upwardly into rectification zone 19 as reflux and the remainder is removed via line 67 into manifold 67a, through block valve 64a at a rate controlled by valve 64 and passes through cooler 68. Valves 61a and 62a are closed in this operation. The stripping steam is condensed herein and the cooled gas and condensate pass via line 69 into separator 70 wherein the two are separated. The condensate is removed from the separator via line 71 controlled by valve 72 which in turn is actuated by liquid level controller 73. The rich gas is removed from separator 70 via line 74 controlled by valve 75 actuated in turn by back pressure regulator 76. The rich gas product comprising the more readily adsorbable constituents, is sent to storage or further processing facilities not shown via line 78.

The partially stripped adsorbent passes from steaming zone 21 through the tubes of stripping gas engaging zone 22 into second desorption zone 22a and into heating zone 23. The stripping gas employed in the process is introduced via line 79 at a rate controlled by valve 80 and is introduced into jet ejector 81 from which it passes via line 82 through block valve 82a into stripping gas engaging zone 22. This stripping gas is combined with stripping gas removed from stripping gas disengaging zone 26 and recirculated into the low pressure point of the ejector through lines 82 and 83 controlled by valve 84 actuated by thermocouple point 84a and temperature recorder controller 83a. A portion of the stripping gas so introduced passes upwardly countercurrent to the adsorbent in preferential desorption zone 21 while the remainder passes downwardly through second desorption zone 22a and heating zone 23 concurrent with the adsorbent and is removed from stripping gas disengaging zone 26 together with adsorbed stripping gas desorbed within the tubes of heating zone 23 when the temperature of the adsorbent is raised. As the adsorbent passes downwardly through heating zone 23 through the tubes thereof the adsorbent is indirectly heated by flue gases or condensing vapors to a temperature sufficient that a substantially complete desorption of adsorbed constituents including stripping gas is effected in the presence of the concurrent flow of recycle stripping gas. The temperature to which the adsorbent is heated is dependent upon the quantity of stripping gas employed as well as the nature of the constituents to be desorbed, and ranges from about 250° F. to as high as 700° F. or higher. It is also desirable, as will become clear as the subsequent portions of the process are described, that the adsorbent leave the heating zone saturated with adsorbed stripping gas which may be steam. The quantity of adsorbed stripping gas varies inversely with the temperature and directly with the pressure. It is desirable to operate at a low heating zone outlet temperature so that the adsorbent may carry with it a high concentration of adsorbed steam sufficient to permit a desired amount of direct cooling by desorption and it is desirable to operate at a high heating zone outlet temperature to minimize the quantity of recycled stripping gas necessary for desorption. Consequently the optimum temperature exists for most efficient operation of the stripping and cooling steps which varies with the individual gaseous mixture under treatment.

Part of the recirculating stripping gas may be continuously removed from line 82 by means of line 85 controlled by valve 86 and introduced into cooler 87 wherein the gas is cooled to separate the desorbed rich gas from the stripping gas. The cooled mixture passes via line 88 into separator 89 wherefrom condensate passes by means of line 90 controlled by valve 91 which in turn is actuated by liquid level controlled 92. The rich gas fraction is removed from separator 89 via line 93 controlled by valve 94 actuated by back pressure regulator 95 and passes to rich gas product storage or processing facilities not shown via line 77.

In another modification of the method of combined countercurrent and concurrent stripping which will be termed operation II, jet ejector 81 is eliminated and stripping gas is directly introduced into engaging zone 22 via line 79 controlled by valve 80 with block valves 82a and 64a open and block valves 62a and 61a closed. A portion of the stripping gas countercurrently contacts the rich adsorbent in preferential desorption zone 21 while the remainder flows downwardly into second desorption zone 22a and through heating zone 23. The usual internal stripping gas recycle in heating zone 23 is considerably reduced. The rich gas is separated and treated as above in operation I and valves 84 and 86 remain closed.

In another modification of the present invention, termed operation III, the stripping gas is introduced via line 79 controlled by valve 80, through ejector 81, through manifold 67a and block valve 61a and line 67 into zone 20 which here serves as the stripping gas engaging zone. Rich gas is withdrawn via line 82, and 63a through block valve 62a controlled as before by valve 64, temperature recorder controller 65 and thermocouple 66. The adsorbent is countercurrently contacted by stripping gas in rectification zone 19 the bottom portion of which serves as the preferential desorption zone in this modification. The adsorbent is concurrently contacted in zones 21, 22a and 23. The concurrent flow of stripping gas is withdrawn from zone 26 via lines 82 and 83 controlled by valve 84 and recycled to the stripping gas inlet. In this operation block valves 61a and 62a are open and block valve 64a and 82a are closed.

The hot lean adsorbent produced in any of the aforementioned operations is saturated with stripping gas and passes from heating zone 23 through the tubes of stripping gas disengaging zone 26 into adsorbent feeder zone 27. Herein the rate of adsorbent flow through the column is controlled to any desired value by a reciprocating tray 27a which alternating aligns the tubes thereof with the tubes of the tray 27b immediately above and the holes of tray 27c immediately below. The adsorbent accumulates in bottom zone 28 wherein accumulation 96 of solid granular adsorbent is maintained through the coaction of level controller 97 and adsorbent flow control valve 98 in chamber 30.

Means are provided in the form of line 116 controlled by valve 117 for the introduction of gases such as those produced from adsorbent flow control valve chamber 30 into the feed gas inlet for reprocessing. The lift gas contains constituents present in the lean gas product and the stripping gas contains constituents of the rich gas product, the combination of these gases removed via line 112 controlled by valve 113 may be reprocessed by introduction into the feed gas inlet line 56 via line 116.

Flow control valve 98 is actuated by pneumatic valve headworks 99 although conventional electrically operated automatic valve headworks may be substituted. The hot lean adsorbent, saturated with stripping gas, passes downwardly through sealing leg 29 through flow control valve chamber 30 as previously described and is combined in transfer line 31 with adsorbent flowing via line 54 from the reactivator. The hot lean adsorbent is recirculated as above described into the upper portion of selective adsorption column 10 wherein it collects in storage zone 11.

The adsorbent at this point is at a somewhat lower temperature than it was when discharged from the heating zone 23 since the lift gas causes some desorption of stripping gas by a reduction in the partial pressure of the stripping gas in lift line 33. It is saturated with stripping gas at that temperature and the partial pressure of stripping gas employed in the operation. Before the adsorbent may be reused to contact the feed gas mixture it must be cooled and one particular novel feature of the present invention is the manner in which the adsorbent is conditioned by the cooling operation.

The adsorbent passes downwardly from hopper 11 through the tubes of cooling zone 12 wherein it is indirectly cooled by a cooling medium circulated outside of the tubes. Simultaneously with this indirect cooling operation a portion of gas present in the upper portion of the column is removed therefrom via line 100 and is passed through cooler 101 into separator 102. The gas thus removed from the column contains stripping gas desorbed from the cooling adsorbent by circulation of a drying gas countercurrently through the tubes of the cooling zone or by deliberately forcing a part or all of the lean gas product upwardly through the cooling zone by adjusting valve 111. Condensed stripping gas separates in separator 102 from which it is removed via line 103 controlled by valve 104 actuated by liquid level controller 105a. The drying gas is removed from separator 102 via line 105 and may be introduced into the suction inlet of drying gas recirculation blower 106 via line 107.

The drying gas stream has a composition approximating that of the lift gas although it is generally enriched somewhat in the constituents which are less readily adsorbable. Provision is made in the form of line 114 provided with valve 115 for the introduction or removal of gas into or from line 110 through which the drying gas is introduced into engaging zone 15. A portion of the drying gas may be removed from line 105 if desired through line 108 controlled by valve 109 or this connection may be employed to introduce additional drying gas if desired. Recirculated drying gas passes from blower 106 via line 110 controlled by valve 111 in accordance with differential pressure controller 111a and is introduced into drying gas engaging zone 15 wherefrom a portion passes downwardly to be combined with the lean gas product to be removed from lean gas disengaging zone 16 and the remaining portion passes upwardly to desorb stripping gas from the adsorbent present in cooling zone 12. In desorbing this stripping gas from the adsorbent, heat is absorbed from the adsorbent proper due to the endothermic desorption of adsorbed gas causing a drop in temperature while the recirculated drying gas picks up desorbed quantities of stripping gas which are removed from the upper portion of column 10 via line 100. To prevent the carry-over of adsorbent with the gas thus removed baffle 112 is provided forming chamber 113 from which line 100 conveys the drying gas and desorbed stripping gas.

The relative degree of direct desorption cooling obtainable is entirely dependent upon the temperature and stripping gas partial pressure in heating zone 23. In Table 1 immediately below is shown the effect of these variables on the amount of stripping steam adsorbed per pound of charcoal and on the quantity of heat which may be removed from the charcoal by desorption cooling. The heat removal is expressed as a percent of that required to cool the charcoal from the temperature shown to 100° F. The conditions of temperature and pressure at the heating zone outlet are preferably controlled so that sufficient adsorbed stripping steam or other stripping gas remains adsorbed on the adsorbent so that at least about 5% of the cooling and preferably above 10% of the cooling may be by direct means in the cooler where a lean gas stream causes desorption of adsorbed stripping gas. The conditions are obtainable from the following table:

TABLE 1

| Pressure p. s. i. ab. | T. °F. | | | | | |
|---|---|---|---|---|---|---|
| | 250 | | 450 | | 650 | |
| | lb./lb. | Percent | lb./lb. | Percent | lb./lb. | Percent |
| 20 | 0.363 | 1.040 | 0.002 | 1.8 | | |
| 50 | | | 0.0115 | 10 | | |
| 100 | | | 0.038 | 31 | | |
| 200 | | | 0.078 | 69 | | |
| 300 | | | 0.308 | 283 | | |
| 500 | | | | | 0.002 | 0.5 |
| 1,000 | | | | | 0.015 | 4.0 |
| 1,500 | | | | | 0.039 | 10.8 |
| 2,000 | | | | | 0.149 | 41 |
| | | | | | 0.287 | 80 |

It is immediately evident that for some particular operations, for example, at a pressure of about 230 pounds per square inch and a heating zone outlet temperature of 450° F. that the hot lean adsorbent may be cooled directly by desorption cooling to 100° F. suitable for readsorption in the absence of indirect cooling. For these instances, cooler 12 may be substantially reduced in duty or sometimes eliminated altogether.

The entire quantity of lean gas or at least a part of it may thus be employed to bring about desorption cooling of the adsorbent. The lean or discharge gas product is produced containing stripping gas which is readily separable by cooling.

This combined operation of indirect and direct cooling of the hot lean adsorbent permits a substantial reduction in the quantity of cooling medium required to indirectly cool the adsorbent while the methods for adsorbent stripping reduce the required amount of stripping gas. The cooled lean adsorbent produced from the cooling zone passes downwardly through the tubes of drying gas engaging zone 15 and lean gas product disengaging zone 16 into adsorption zone 17 wherein it contacts further quantities of the gaseous mixture to be separated.

The effects of the improvements described herein upon the selective adsorption process may be readily understood from the following examples of previous operation and operations I, II, and III described above.

A gaseous mixture flowing at the rate of 2140 pound mols per hour was to be separated. The mixture had the composition given in Table 2.

TABLE 2

FEED GAS COMPOSITION

| Component | Volume Percent |
|---|---|
| $H_2$ | 17.86 |
| $CH_4$ | 40.11 |
| $C_2H_4$ | 9.15 |
| $C_2H_6$ | 24.88 |
| $C_3H_6$ | 2.42 |
| $C_3H_8$ | 4.13 |
| $C_4$'s | 0.99 |
| $C_5$'s | 0.21 |
| $C_6$'s | 0.25 |
| | 99.95 |

In a conventional selective adsorption process the rich charcoal adsorbent is contacted with a countercurrent stream of stripping steam in the tubes of the heating zone column. The desorbed rich gas, the throughput stripping steam as well as the above described internal recycle steam flowing through the heater tubes results in a column diameter limiting condition in the upper part of the heating tubes where the product of the superficial gas velocity in feet per second and the gas viscosity in centipoises is 0.0169. It is this value of gas flow at this point which determines the column diameter. In the following examples, the velocity-viscosity products are expressed as percentages of the above value.

*Example I*

In operation I described above, the gaseous mixture was contacted with a moving bed of granular coconut charcoal. The rich charcoal was first contacted with a countercurrent flow of stripping steam in preferential desorption zone 19 and a concurrent recirculating flow of stripping gas in heating zone 23 in a 12'2" column. The limiting gas flow condition was moved from the upper heating zone 23 to the stripping gas engaging zone 22 and reduced to 56.3%. The same separation in a 10'0" diameter column was limited in zone 22 with a gas flow value of 83.5%. This permits a reduced column diameter.

*Example II*

In operation II the rich charcoal formed in the adsorption zone was treated for recovery of adsorbed gases as in Example I except that no recirculation was employed in the concurrent stripping steam. In this way the internal recycle of stripping steam was substantially reduced to a gas flow value of 60.5% in a 12'2" column and to 87% in a 10'0" column.

*Example III*

In operation III the stripping steam was introduced above the rich gas outlet and recirculation of concurrent stripping steam employed through the heating zone 23. The gas flow valve which determined the column diameter was found to be at the rich gas product outlet and had been reduced to a value of 40% to 55% of the former value in a 12'2" column. The use of a 10'0" column for this gas separation was possible in operation III.

In the foregoing examples the quantities of stripping steam are materially reduced. The quantity of cooling water may be reduced by employing direct desorption cooling as above described and illustrated in conjunction with the improved stripping operations shown. The end result is one in which utilities are minimized and column diameters are also reduced.

The process of the present invention is unlimited by pressure since the pressure of the operation is necessarily dictated by the analysis of the gaseous mixture to be separated. Pressures as low as atmospheric to as high as 1,000 pounds per square inch or higher may be employed without departing from the scope of the present invention. Pressures may also be chosen to take advantage of the economy resulting from direct desorption cooling. Furthermore, the adsorbent employed in this invention while preferably being an activated vegetable charcoal may just as well be other adsorbents such as silica gel or other gel adsorbents, activated bauxite or other forms of aluminum oxide and the like. A method with which the adsorbent is conveyed from the lower portion to the upper portion of the selective adsorption column is not intended to be in limitation to the process since other mechanical means may be employed to effect this circulation. Furthermore, it is not intended that the production of two product streams from a gaseous mixture be a limitation to the process since the essence of the present invention of conditioning the adsorbent employed in the selective adsorption process may be applied with the same advantages herein described to modifications of the selective adsorption process in which 3, 4 or more individual fractions of a gaseous mixture are produced. The use of a jet ejector in the recirculation of the stripping gas through the tubes of the heating zone is a mechanical expedient and since this type is readily controllable and has no moving parts, it is preferred over blowers, pumps, compressors, and the like, which may be substituted therefor. It is not desired, however, to preclude the use of these types of apparatus from the scope of the present invention.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A process for the separation of a gaseous mixture which comprises contacting said gaseous mixture with a downwardly moving bed of solid granular adsorbent in an adsorption zone to adsorb the more readily adsorbable constituents forming a rich adsorbent leaving less readily adsorbable constituents as a substantially unadsorbed lean gas first countercurrently contacting said rich adsorbent with a stripping gas to form a partially stripped adsorbent, subsequently, indirectly heating said partially stripped adsorbent while contacting said adsorbent with a concurrent flow of stripping gas in a desorption zone to desorb said more readily adsorbable constituents as a rich gas leaving a hot lean adsorbent saturated with adsorbed stripping gas, subsequently indirectly cooling said lean adsorbent while contacting said adsorbent with at least a portion of said lean gas in a cooling zone thereby directly cooling said lean adsorbent by desorbing adsorbed stripping gas therefrom leaving a lean cool adsorbent, and recirculating said adsorbent to contact further quantities of said gaseous mixture.

2. A process for separating a gaseous mixture which comprises adsorbing the more readily adsorbable constituents from said mixture on a downwardly moving bed of solid granular adsorbent in an adsorption zone forming a rich adsorbent and leaving a lean gas containing less readily adsorbable constituents, subsequently indirectly heating said rich adsorbent while contacting it with a stripping gas in a desorption zone to desorb more readily adsorbable constituents leaving a hot lean adsorbent saturated with adsorbed stripping gas, controlling the heating step to regulate the amount of adsorbed stripping gas, subsequently contacting said hot lean adsorbent with a recirculating stream of said lean gas in a cooling zone to directly cool said adsorbent by desorbing adsorbed stripping gas therefrom, cooling said recirculating lean gas removed from contact with said adsorbent to separate stripping gas therefrom, recirculating the portion of lean gas thus obtained to contact further quantities of said hot lean adsorbent thereby forming a cool lean adsorbent, and recirculating the adsorbent thus obtained to contact further quantities of said gaseous mixture.

3. A process according to claim 2 wherein said stripping gas comprises steam.

4. In a process for the separation of a gaseous mixture by selective adsorption which comprises contacting said gaseous mixture with a downwardly moving bed of solid granular adsorbent in an adsorption zone to form a rich adsorbent by adsorbing the more readily adsorbable constituents leaving a lean gas containing less readily adsorbable constituents, subsequently heating said rich adsorbent and contacting the adsorbent with a stripping gas in a desorption zone to desorb more readily adsorbable constituents as a rich gas leaving a hot lean adsorbent saturated with stripping gas, subsequently cooling said hot adsorbent in a cooling zone prior to recirculating said adsorbent to contact further quantities of said gaseous mixture, the improvement which comprises first countercurrently contacting said rich adsorbent with a separately added stripping gas in a preferential desorption zone, then indirectly heating the adsorbent in said desorption zone while concurrently contacting the indirectly heated adsorbent with a recirculating stream of stripping gas to desorb the more readily adsorbable constituents from said rich adsorbent forming a hot lean adsorbent saturated with adsorbed stripping gas, indirectly cooling said hot lean adsorbent in said cooling zone while contacting said adsorbent with a recirculating stream of lean gas to directly cool said adsorbent by desorbing adsorbed stripping gas therefrom, and separating desorbed stripping gas continuously from said circulating lean gas stream.

5. In a process for the separation of a gaseous mixture by continuous selective adsorption in which the more readily adsorbable constituents are adsorbed through contact with a downwardly moving bed of solid granular adsorbent in an adsorption zone leaving less readily adsorbable constituents substantially unadsorbed as a lean gas and forming a rich adsorbent, and subsequently recovering adsorbed constituents from said rich adsorbent by contact with a stripping gas, the improvement which comprises first contacting said rich adsorbent countercurrently with a first fraction of said stripping gas in a preferential desorption zone to desorb more readily adsorbable constituents therefrom leaving a partially stripped adsorbent, subsequently contacting said partially stripped adsorbent concurrently with a second fraction of said stripping gas in a second desorption zone, recirculating at least a part of said second fraction of stripping gas through said second desorption zone in concurrent contact with said partially stripped adsorbent, and continuously removing the remaining part of said second fraction with desorbed more readily adsorbable constituents from said recirculating stream leaving a hot lean adsorbent saturated with adsorbed stripping gas.

6. A process according to claim 5 wherein said partially stripped adsorbent is indirectly heated while concurrently contacted with said recirculating portion of said second fraction of stripping gas to control the quantity of adsorbed stripping gas adsorbed on said hot lean adsorbent.

7. In a selective adsorption process for separating a gaseous mixture through contact with a downwardly moving bed of solid granular adsorbent whereby more readily adsorbable constituents are adsorbed thereon in an adsorption zone forming a rich adsorbent leaving a lean gas containing less readily adsorbable constituents, subsequently recovering adsorbed constituents from said rich adsorbent by indirect heating and direct contact with a separately added stripping gas in a desorption zone leaving a hot lean adsorbent saturated with adsorbed stripping gas, subsequently cooling said hot lean adsorbent in a cooling zone prior to contacting further quantities of said gaseous mixture, the improvement which comprises cooling said hot lean adsorbent in said cooling zone simultaneously by indirect heat exchange with a cooling medium and by passing at least a portion of said lean gas through said moving bed of indirectly cooling adsorbent to desorb adsorbed stripping gas therefrom and thereby remove at least about 5% of the heat by direct desorption, and returning the cooled adsorbent to contact further quantities of said gaseous mixture.

8. A process for the separation of a gaseous mixture which comprises passing a moving bed of solid granular adsorbent downwardly by gravity successively through a cooling zone, an adsorption zone, at least one rectification zone, a preferential desorption zone, a heating zone and an adsorbent feeding zone, conveying adsorbent from said feeding zone to said cooling zone for repassage through said zones, introducing said gaseous mixture into said adsorption zone forming a rich adsorbent by adsorbing more readily adsorbable constituents and leaving less readily adsorbable constituents as a lean gas, removing at least part of said less readily adsorbable constituents from said adsorption zone as a lean gas product, contacting said rich adsorbent in a rectification zone with a reflux gas containing more readily adsorbable constituents forming a rectified adsorbent substantially free of less readily adsorbable constituents, introducing a first portion of a stripping gas into the lower portion of said preferential desorption zone and a second portion into the upper portion of said heating zone, countercurrently contacting said rectified adsorbent in said preferential desorption zone with said first portion thereby desorbing a major proportion of said more readily adsorbable constituents leaving a partially stripped adsorbent, removing said desorbed constituents from said preferential desorption zone as a rich gas product, subsequently contacting said partially stripped adsorbent concurrently with said second portion of said stripping gas to desorb the remaining adsorbed constituents while indirectly heating said adsorbent in said heating zone and recirculating at least a part of said second portion of said stripping gas concurrently through said partially stripped adsorbent in said heating zone.

9. A process according to claim 8 wherein said stripping gas comprises steam.

10. A process according to claim 8 wherein said solid granular adsorbent comprises activated vegetable charcoal.

11. A process for the separation of a gaseous mixture which comprises recirculating a moving bed of granular charcoal by gravity successively through a tubular cooling zone, an adsorption zone, at least one rectification zone, a steaming zone, and a tubular heating zone, introducing said gaseous mixture into said adsorption zone, removing a lean gas product comprising less readily adsorbable constituents from said adsorption zone, removing a rich gas product comprising more readily adsorbable constituents from said preferential desorption zone, introducing steam into said preferential desorption zone, a first portion of which countercurrently contacts rich charcoal therein to desorb the major proportion of more readily adsorbable constituents and a second portion of which is recirculated concurrently through said tubular heating zone to desorb the remaining portion of more readily adsorbable constituents, and controlling the stripping operation in accordance with the temperature of charcoal present in said preferential desorption zone.

12. A process for the separation of a gaseous mixture which comprises recirculating a moving bed of granular charcoal by gravity successively through a tubular cooling zone, an adsorption zone, at least one rectification zone, a steaming zone, and a tubular heating zone, introducing said gaseous mixture into said adsorption zone, removing a lean gas product comprising less readily adsorbable constituents from said adsorption zone, contacting said rich charcoal with stripping steam to desorb the more readily adsorbable constituents as a rich gas product, removing said rich gas product thus desorbed from the charcoal, controlling the temperature to which said charcoal is indirectly heated to vary the quantity of adsorbed stripping steam present thereon, subsequently contacting said hot lean charcoal in said cooling zone with a recirculated stream of lean gas thereby desorbing adsorbed stripping steam therefrom to directly cool said hot lean adsorbent while indirectly cooling said hot lean adsorbent, cooling the recirculated lean gas stream removed from said cooling zone, separating condensed stripping steam therefrom, recirculating a portion of the dry lean gas thus obtained, combining the remaining portion with said lean gas product, and conveying the cool lean charcoal to said adsorption zone.

13. A process for the separation of a gaseous mixture which comprises passing a moving bed of granular activated charcoal through a vertical column containing at successively lower levels therein a cooling zone, a lean gas product disengaging zone, an adsorption zone, a rectification zone, a rich gas product disengaging zone, a preferential desorption zone, a stripping gas engaging zone, a tubular heating zone and a stripping gas disengaging zone, passing said gaseous mixture into said adsorption zone to form a rich charcoal containing more readily adsorbable constituents adsorbed thereon leaving less readily adsorbable constituents as a substantially unadsorbed lean gas, removing at least a part of said lean gas product from said lean gas disengaging zone, contacting said rich charcoal in said rectification zone with a rich gas reflux to form a rectified charcoal, introducing a stripping gas together with recirculated stripping gas removed from said stripping gas disengaging zone into said stripping gas engaging zone, countercurrently contacting said rectified charcoal in said preferential desorption zone with a first portion of said stripping gas thereby desorbing adsorbed more readily adsorbable constituents leaving a partially stripped charcoal, removing the thus desorbed constituents from said rich gas product disengaging zone, subsequently indirectly heating said partially stripped charcoal in said heating zone, passing said second portion of said stripping gas concurrently through said heating zone to desorb remaining adsorbed constituents forming a hot lean charcoal, returning the said second portion of stripping gas and desorbed gases from said stripping gas disengaging zone to said stripping gas engaging zone, and subsequently cooling said hot lean charcoal prior to contacting further quantities of said gaseous mixture.

14. A process for the separation of a gaseous mixture which comprises passing a moving bed of granular activated charcoal downwardly by gravity through a column containing a cooling zone, an adsorption zone, a rectification zone, a preferential desorption zone, a stripping steam inlet zone, and a heating zone at successively lower levels therein, introducing said gaseous mixture into said adsorption zone forming a rich charcoal by adsorption thereon of more readily adsorbable constituents and leaving less readily adsorbable constituents as a substantially unadsorbed lean gas, separating said lean gas as a product from said adsorption zone, contacting said rich charcoal in said rectification zone with a rich gas reflux forming a rectified charcoal free of less readily adsorbable constituents, first countercurrently contacting said rectified charcoal in said preferential desorption zone with stripping steam introduced into said steam inlet zone to desorb more readily adsorbable constituents as a rich gas leaving a partially stripped charcoal containing adsorbed steam, removing at least part of desorbed constituents as a rich gas product from said preferential desorption zone, subsequently indirectly heating said partially stripped charcoal in said heating zone to desorb remaining portions of more readily adsorbable constituents and steam forming a hot lean charcoal, subsequently cooling said hot lean charcoal, and recirculating the cooled charcoal to contact further quantities of said gaseous mixture.

15. In a process for the separation of gaseous mixtures which comprises adsorbing more readily adsorbable constituents therefrom on a solid granular adsorbent in an adsorption zone forming a rich adsorbent and leaving less readily adsorbable constituents as a substantially unadsorbed lean gas, and subsequently desorbing adsorbed constituents from said rich adsorbent in a desorption and heating zone as a rich gas product, the improvement which comprises performing said desorption of adsorbed constituents by passing said rich adsorbent through a preferential desorption zone in contact with a countercurrent flow of stripping gas, introduced thereinto, removing a rich gas product comprising part of the desorbed more readily adsorbable constituents from said preferential desorption zone, subsequently passing the partially stripped adsorbent thus formed containing adsorbed stripping gas and undesorbed rich gas through a heating zone, indirectly heating the partially stripped adsorbent therein to desorb remaining quantities of more readily adsorbable constituents and adsorbed stripping gas leaving a hot lean adsorbent, and cooling and recirculating said adsorbent to contact further quantities of said gaseous mixture.

16. A process for the separation of a gaseous mixture which comprises passing a moving bed of solid granular adsorbent downwardly by gravity successively through a cooling zone, an adsorption zone, at least one rectification zone, a stripping gas inlet zone, a rich gas product outlet zone, an indirect heating zone and a recirculated stripping gas outlet zone, introducing said gaseous mixture into said adsorption zone thereby forming a rich adsorbent with more readily adsorbable constituents and leaving a substantially unadsorbed lean gas of less readily adsorbable constituents, contacting said rich adsorbent with a rich gas reflux to desorb traces of less readily adsorbable constituents forming a rectified adsorbent, introducing a stripping gas into said stripping gas inlet zone, passing a first fraction thereof into said rectification zone to countercurrently contact said rectified adsorbent and desorb part of adsorbed constituents leaving a partially stripped adsorbent, passing a second fraction of said stripping gas concurrently with the adsorbent from said stripping gas inlet zone toward said rich gas product outlet zone, removing part of said second fraction of stripping gas together with desorbed constituents from said rich gas product outlet zone, passing said partially stripped adsorbent through said heating zone, contacting the heated adsorbent therein with the remaining part of said second fraction of stripping gas as a concurrent flow and desorbing the remaining more readily adsorbable constituents forming a hot lean adsorbent, removing said concurrent flow of stripping gas and desorbed gases from said recirculated stripping gas disengaging zone, combining the thus removed gases with stripping gas introduced into said stripping gas inlet zone, cooling said hot lean adsorbent, and returning the cooled adsorbent to contact further quantities of said gaseous mixture.

17. In a process for the separation of a gaseous mixture by selective adsorption in which the adsorbent is passed as a moving bed downwardly through a cooling zone, an adsorption zone, at least one rectification zone, a preferential desorption zone and a heating zone, contacting said gaseous mixture with said adsorbent in said adsorption zone leaving a substantially unadsorbed lean gas and forming a rich adsorbent from more readily adsorbable constituents, subsequently heating said rich adsorbent while contacting same with a stripping gas to desorb more readily adsorbable constituents as a rich gas product and leaving a hot lean adsorbent, cooling said hot lean adsorbent and recirculating the cool adsorbent to said adsorption zone, the improvement while comprises controlling the temperature of lean adsorbent discharged from said heating zone so that adsorbed stripping gas remains thereon, and reducing the cooling duty of said cooling zone by directly cooling said adsorbent therein by desorbing adsorbed stripping gas in the presence of a stream of lean gas.

18. A process for the separation of a gaseous mixture which comprises contacting said mixture with a moving bed of granular activated charcoal in an adsorption zone thereby forming a rich charcoal containing more readily adsorbable constituents of said mixture and leaving a lean gas substantially unadsorbed, removing at least a portion of the unadsorbed gas as a lean gas product, subsequently countercurrently contacting said rich charcoal with stripping steam in a desorption zone to desorb adsorbed more readily adsorbable constituents leaving a partially stripped charcoal, subsequently heating said stripped adsorbent in a heating zone and concurrently contacting said adsorbent with further stripping steam to desorb remaining portions of adsorbed more readily adsorbable constituents leaving a hot lean charcoal saturated with adsorbed stripping steam at the temperature and pressure of the heating zone outlet, directly cooling said adsorbent by contacting same with at least a portion of said lean gas product to desorb adsorbed stripping steam and thereby adsorbing heat from said adsorbent forming a mixture of lean gas and stripping steam, and returning the cooled lean adsorbent to contact further quantities of said gaseous mixture in said adsorption zone.

19. In a process for desorbing adsorbed constituents from a solid adsorbent, the steps of first countercurrently contacting said adsorbent directly with a stripping gas in the absence of indirect heating to form a partially stripped adsorbent, and subsequently indirectly heating said partially stripped adsorbent in the presence of a concurrent flow of stripping gas forming a hot lean adsorbent.

20. In a process for desorbing adsorbed constituents from a solid adsorbent, the steps of first countercurrently contacting said adsorbent directly with a stripping gas in the absence of indirect heating to form a partially stripped adsorbent, subsequently indirectly heating said partially stripped adsorbent in the presence of a concurrent flow of a recirculated stripping gas to form a hot lean adsorbent.

21. In a process for desorbing adsorbed constituents from a solid adsorbent, the steps of first countercurrently contacting said adsorbent directly with a stripping gas in the absence of indirect heating to form a partially stripped adsorbent, subsequently indirectly heating said partially stripped adsorbent in the presence of a concurrent flow of a recirculated stripping gas and desorbed constituents forming a hot lean adsorbent.

22. In a process for recovering adsorbed constituents from an adsorbent, the steps of passing the adsorbent successively through a rich gas product disengaging zone, a preferential desorption zone, a stripping gas engaging zone, a tubular heating zone, and a stripping gas disengaging zone, introducing a stripping gas together with recirculated stripping gas removed from said stripping gas disengaging zone into said stripping gas engaging zone, countercurrently contacting said adsorbent in said preferential desorption zone with a first portion of said stripping gas thereby desorbing adsorbed more readily adsorbable constituents leaving a partially stripped adsorbent, removing the thus desorbed constituents from said rich gas product disengaging zone, subsequently indirectly heating said partially stripped adsorbent in said heating zone, passing said second portion of said stripping gas concurrently through said heating zone to desorb remaining adsorbed constituents forming a hot lean adsorbent, returning the said second portion of stripping gas and desorbed gases from said stripping gas disengaging zone to said stripping gas engaging zone.

23. In a process for recovering adsorbed constituents from an adsorbent, the steps of passing the adsorbent successively through a rich gas disengaging zone, a preferential desorption zone, a stripping gas engaging zone, and an indirect heating zone, countercurrently contacting said adsorbent in said preferential desorption zone with stripping gas introduced into said stripping gas inlet zone to desorb more readily adsorbable constituents as a rich gas leaving a partially stripped adsorbent containing adsorbed stripping gas, removing at least part of desorbed constituents as a rich gas product from said preferential desorption zone, subsequently indirectly heating said partially stripped adsorbent in said heating zone to desorb remaining portions of more readily adsorbable constituents and stripping gas forming a hot lean adsorbent, and subsequently cooling said hot lean adsorbent.

24. In a process for recovering adsorbed constituents from a solid adsorbent, the steps of passing said adsorbent successively through a rectification zone, a stripping gas engaging zone, a preferential desorption zone, a rich gas product disengaging zone, an indirect heating zone, and a stripping gas disengaging zone, introducing a stripping gas into said stripping gas engaging zone, passing a first fraction thereof into said rectification zone to countercurrently contact said adsorbent and desorb part of the adsorbed constituents leaving a partially stripped adsorbent, passing a second fraction of said stripping gas concurrently with said partially stripped adsorbent through said preferential stripping zone, removing part of said second fraction of stripping gas and desorbed constituents from said rich gas disengaging zone, subsequently passing said adsorbent through said heating zone, contacting the heated adsorbent therein with the remaining part of said second fraction of stripping gas as a concurrent flow to desorb the remaining constituents forming a hot lean adsorbent, removing said concurrent flow of gas from said stripping gas disengaging zone and combining the thus removed gas with stripping gas introduced into said stripping gas engaging zone.

25. A process for recovering adsorbed constituents from a granular adsorbent which comprises first countercurrently contacting said adsorbent with a stripping gas to desorb at least part of the adsorbed constituents leaving a partially stripped adsorbent, subsequently indirectly heating said partially stripped adsorbent in a heating zone concurrently contacting said adsorbent with further stripping gas to desorb remaining quantities of adsorbed constituents leaving a hot stripped adsorbent saturated with adsorbed stripping gas at the temperature and pressure of the heating zone outlet, and directly cooling said hot stripped adsorbent by desorbing adsorbed stripping gas therefrom in the presence of a relatively unadsorbable gas.

26. An apparatus for the separation of a gaseous mixture which comprises a vertical cylindrical selective adsorption column provided at successively lower levels therein with a tubular cooling section, a lean gas product disengaging tray, a feed gas engaging tray, a rich gas product disengaging tray, a stripping gas engaging tray, a tubular heating section, a recycle stripping gas disengaging tray below said heating section, means for introducing a solid granular adsorbent into the upper portion of said column, means for removing adsorbent from the bottom of said column at a controlled rate of flow, means for returning adsorbent thus removed to the upper portion of said column, means for introducing a gaseous mixture into said feed gas engaging tray, means for removing a portion of lean gas from said lean gas disengaging tray while passing the remaining portion of lean gas upwardly through said cooling section countercurrent to the downward flow of adsorbent, means for recirculating said portion of lean gas through said cooling section in direct contact with said adsorbent, cooling means and separator means for removing desorbed stripping gas from the recirculated lean gas stream, means for introducing stripping gas into said stripping gas engaging tray, means for recirculating a portion of stripping gas removed from said recycle stripping gas disengaging tray to said stripping gas engaging tray, means for removing desorbed constituents and stripping gas from said rich gas product disengaging tray, and cooling and separator means for separating stripping gas from said rich gas product.

27. An apparatus for the separation of gaseous mixtures which comprises a vertical selective adsorption column provided therein with a tubular cooling section, a lean gas product disengaging tray, a feed gas engaging tray, a rich gas product disengaging tray above a stripping gas engaging tray, a tubular heating section below said stripping gas engaging tray, a recycle stripping gas disengaging tray below said heating section, means for introducing a solid granular adsorbent into the upper portion of said column, means for removing adsorbent from the bottom of said column at a controlled rate of flow, means for returning adsorbent thus removed to the upper portion of said column, means for introducing a gaseous mixture into said feed gas engaging tray, means for removing a portion of lean gas from said lean gas disengaging tray while passing the remaining portion of lean gas upwardly through said cooling section countercurrent to the downward flow of adsorbent, means for introducing stripping gas into said stripping gas engaging tray, means for recirculating a portion of stripping gas removed from said recycle stripping gas disengaging tray to said stripping gas engaging tray, means for removing desorbed constituents and stripping gas from said rich gas product disengaging tray, and cooling and separator means for separating stripping gas from said rich gas product.

28. An apparatus for the separation of a gaseous mixture which comprises a vertical selective adsorption column provided therein with a tubular cooling section, a lean gas product disengaging tray, a feed gas engaging tray, a rich gas product disengaging tray above a stripping gas engaging tray, a tubular heating section below said stripping gas engaging tray, means for introducing a solid granular adsorbent into the upper portion of said column, means for removing adsorbent from the bottom of said column at a controlled rate of flow, means for returning adsorbent thus removed to the upper portion of said column, means for introducing a gaseous mixture into said feed gas engaging tray, means for removing a portion of lean gas from said lean gas disengaging tray while passing the remaining portion of lean gas upwardly through said cooling section countercurrent to the downward flow of adsorbent, means for introducing stripping gas into said stripping gas engaging tray, means for removing desorbed constituents and stripping gas from said rich gas product disengaging tray, and cooling and separator means for separating stripping gas from said rich gas product.

29. An apparatus for the separation of a gaseous mixture which comprises a vertical selective adsorption column provided with a tubular cooling section, a lean gas product disengaging tray, a feed gas engaging tray, a stripping gas engaging tray above a rich gas product disengaging tray, a tubular heating section below said rich gas product disengaging tray and a recycle stripping gas disengaging tray below said heating section, means for introducing a solid granular adsorbent into the upper portion of said column, means for removing adsorbent from the bottom of said column at a controlled rate of flow, means for returning adsorbent thus removed to the upper portion of said column, means for introducing a gaseous mixture into said feed gas engaging tray, means for removing a portion of lean gas from said lean gas disengaging tray while passing the remaining portion of lean gas upwardly through said cooling section countercurrent to the downward flow of adsorbent, means for introducing stripping gas into said stripping gas engaging tray, means for recirculating a portion of stripping gas removed from said recycle stripping gas disengaging tray to said stripping gas engaging tray, means for removing desorbed constituents and stripping gas from said rich gas product disengaging tray, and cooling and separator means for separating stripping gas from said rich gas product.

CLYDE H. O. BERG.

REFERENCES CITED

The following references are of record in the file of this patent:

UNITED STATES PATENTS

| Number | Name | Date |
|---|---|---|
| 1,422,007 | Soddy | July 4, 1922 |
| 1,522,480 | Allen | Jan. 13, 1925 |
| 1,758,398 | Hasche | May 13, 1930 |
| 1,825,707 | Wagner, Jr. | Oct. 6, 1931 |
| 1,836,301 | Bechthold | Dec. 15, 1931 |
| 1,863,803 | Panentenburg | June 21, 1932 |
| 2,384,311 | Kearby | Sept. 4, 1945 |
| 2,492,401 | Schutte | Dec. 27, 1949 |
| 2,519,874 | Berg | Aug. 22, 1950 |
| 2,527,964 | Robinson | Oct. 31, 1950 |